United States Patent

Deschaume et al.

(10) Patent No.: US 6,729,611 B2
(45) Date of Patent: May 4, 2004

(54) ANTIVIBRATION SLEEVE AND A MOTOR VEHICLE INCLUDING SUCH A SLEEVE

(75) Inventors: Alain Deschaume, Bourges (FR); Ali Medjani, Vierzon (FR); Christophe Duvallet, La Chapelle St Mesmin (FR); André Girard, Mehin/Yevre (FR)

(73) Assignee: Hutchinson, Paris (FR)

(*) Notice: Subject to any disclaimer, the term of this patent is extended or adjusted under 35 U.S.C. 154(b) by 51 days.

(21) Appl. No.: 10/033,819

(22) Filed: Dec. 20, 2001

(65) Prior Publication Data

US 2002/0093170 A1 Jul. 18, 2002

(30) Foreign Application Priority Data

Dec. 22, 2000 (FR) .............................. 00 16924

(51) Int. Cl.$^7$ ................................ F16F 13/00
(52) U.S. Cl. .................... 267/140.12; 267/140.13; 267/141; 267/141.2; 267/219
(58) Field of Search .................. 267/141, 140.11, 267/140.12, 140.13, 140.5, 141.2, 219, 220, 293, 281; 248/562, 636, 638, 635; 280/177, 124.13

(56) References Cited

U.S. PATENT DOCUMENTS

| | | | | |
|---|---|---|---|---|
| 4,634,108 A | * | 1/1987 | Munch | 267/279 |
| 4,834,416 A | * | 5/1989 | Shimoe et al. | 280/124.13 |
| 5,246,248 A | * | 9/1993 | Ferguson | 267/281 |
| 5,251,884 A | * | 10/1993 | Bouhier | 267/140.12 |
| 5,613,668 A | * | 3/1997 | Brunerye | 267/219 |
| 5,655,758 A | | 8/1997 | Hadano et al. | |
| 5,842,687 A | * | 12/1998 | David | 267/140.5 |
| 5,899,431 A | | 5/1999 | Lefol | |
| 6,361,029 B1 | * | 3/2002 | Okai et al. | 267/140.12 |

FOREIGN PATENT DOCUMENTS

| | | |
|---|---|---|
| DE | 1 780 687 | 8/1974 |
| DE | 32 40 981 A | 5/1984 |
| DE | 35 21 361 A | 1/1986 |
| DE | 34 41 560 A | 5/1986 |
| EP | 0 407 303 A | 1/1991 |
| EP | 0 687 830 A | 12/1995 |
| EP | 0 905 405 A | 3/1999 |
| FR | 2 407 399 | 9/1978 |
| FR | 2 434 965 A | 3/1980 |
| FR | 2 717 236 A | 9/1995 |
| FR | 2 791 002 A | 9/2000 |
| GB | 2 008 714 | 6/1979 |
| GB | 2 033 533 A | 9/1979 |
| GB | 2 351 139 A | 12/2000 |
| JP | 10 339349 A | 3/1999 |

OTHER PUBLICATIONS

Official Preliminary Search Report for related French Application No. 0016924, report dated Aug. 28, 2001.

* cited by examiner

*Primary Examiner*—Jack Lavinder
*Assistant Examiner*—Mariano Sy
(74) *Attorney, Agent, or Firm*—Marshall, Gerstein & Borun LLP (57) ABSTRACT

An antivibration sleeve comprising an inner strength member which extends longitudinally along a central axis, a rigid annular strength member surrounding the inner strength member, and an elastomer body which interconnects the two strength members. The strength members have respective wedge-shaped bearing zones placed in register with each other to compress the elastomer body when the antivibration sleeve is supporting a static axial load. The bearing zones of the annular strength member enabling passages to be formed between two hydraulic chambers defined by the elastomer body.

10 Claims, 6 Drawing Sheets

ANTIVIBRATION SLEEVE AND A MOTOR VEHICLE INCLUDING SUCH A SLEEVE

FIELD OF THE INVENTION

The present invention relates to antivibration sleeves and to motor vehicles including such sleeves.

More particularly, the invention relates to an antivibration sleeve comprising:

- a rigid inner strength member which extends longitudinally along a central axis; and
- at least a first rigid annular strength member which surrounds the inner strength member and the central axis, and at least one elastomer body connecting the inner strength member to the first annular strength member, said elastomer body including two diametrically opposite arms each extending along a first radial direction from the inner strength member to said first annular strength member, the elastomer body being shaped so that the antivibration sleeve presents relatively high elastic stiffness in said first radial direction and lower elastic stiffness in a second radial direction substantially perpendicular to said first radial direction.

BACKGROUND OF THE INVENTION

Document DE-A-34 41 560 describes an example of such an antivibration sleeve for connecting a vehicle rear axle to the vehicle body. In that document, the central axis of the antivibration sleeve is disposed vertically, which provides numerous advantages, in particular:

- it is possible to select the elastic stiffness of the antivibration sleeve along its central axis independently of its stiffness along the first and second radial directions, thereby making it possible in particular to obtain an antivibration sleeve that presents low stiffness along its central axis, thus improving the comfort of the vehicle; and
- it is possible to select optimum orientations for the first and second radial directions relative to the longitudinal direction of the vehicle, when designing the rear axle.

Nevertheless, that type of assembly presents the drawback that when the sleeve is to carry static vertical forces, e.g. due to the weight of the vehicle and the rear suspension, the arm of the elastomer body is subjected to shear stresses, and possibly even to traction stresses, and that is harmful to the longevity of the elastic body.

OBJECTS AND SUMMARY OF THE INVENTION

A particular object of the present invention is to mitigate that drawback.

To this end, according to the invention, in an antivibration sleeve of the kind in question:

- the inner strength member presents, at least in register with the two arms of the elastomer body, two wedge-shaped bearing zones which extend so as to converge towards the central axis in a first direction parallel to said central axis;
- the first annular strength member also presents, at least in register with the two bearing zones of the inner strength member, first and second complementary bearing zones in the form of wedges which converge towards the central axis in said first direction; and
- each arm of the elastomer body is bonded to at least one of the bearing zones of the inner strength member and to one of the complementary bearing zones of the first annular strength member.

By means of these dispositions, the antivibration sleeve of the invention is adapted to supporting a static axial load urging the inner strength member in the first direction relative to the first annular strength member and to do so without any harmful effect on the lifetime of the antivibration sleeve.

Because of the wedge-shaped bearing zones provided on the inner strength member and on the first annular strength member, the axial static load supported by the antivibration sleeve becomes a compression prestress in the elastomer body. Such compression prestress is well accepted by the elastomer body and gives rise to no accelerated aging of the antivibration sleeve; on the contrary, said compression prestress prevents or limits the appearance of traction stresses when the inner strength member is subjected to vibratory motion relative to the first annular strength member (i.e. while the vehicle is running and the antivibration sleeve of the invention is used to connect a vehicle rear axle to the vehicle body).

In preferred embodiments of the invention, it is possible also to make use of one or more of the following dispositions:

- the elastomer body is overmolded on the first annular strength member and said first annular strength member is surrounded by a second strength member which is secured to the first annular strength member and to the elastomer body, co-operating with said elastomer body to define first and second hydraulic chambers filled with liquid and separated from each other by the two arms of the elastomer body, the first and second hydraulic chambers communicating with each other via at least one narrow passage which is provided between the first bearing zone of the first annular strength member, and the second strength member;
- the first bearing zone of the first annular strength member co-operates with the second annular strength member to define a first liquid duct which extends in a circumferential direction about the central axis and which communicates firstly with the first hydraulic chamber and secondly with the second hydraulic chamber, said first liquid duct presenting a flow section that is at least three times greater than the flow section of said narrow passage, the elastomer body having a first axial rib which extends radially and parallel to the central axis from the first bearing zone of the first annular strength member to an outside edge in contact with the second annular strength member, said first axial rib thus closing the first liquid duct and presenting sufficient flexibility to enable a certain amount of decoupling between the inner strength member and the first and second annular strength members with respect to at least some radial vibrations at a frequency lying in the range 5 hertz (Hz) to 50 Hz;
- the elastomer body further includes a bead which extends in the circumferential direction between the first bearing zone of the first annular strength member and the second annular strength member, said bead cooperating with the second annular strength member to define said narrow passage and also defining part of the first liquid duct;
- the second bearing zone of the first annular strength member co-operates with the second annular strength member to define a second circumferential liquid duct which communicates firstly with the first hydraulic chamber and secondly with the second hydraulic chamber, and the elastomer body includes a second axial rib which extends radially and parallel to the central axis from the second bearing zone of the first annular strength member to an outside edge in contact with the second annular strength member, the second axial rib closing the second liquid duct and presenting sufficient flexibility to enable a certain amount of decoupling between the inner strength member and the first and second annular strength members with respect to at least some radial vibrations at a frequency lying in the range 5 Hz to 50 Hz;

the first annular strength member is constituted by a metal ring which presents two openings disposed respectively in register with the first and second hydraulic chambers, these two openings being separated from each other by said first and second bearing zones which are constituted by stamped portions of the metal ring;

the first and second hydraulic chambers are occupied in part by inserts adapted to limit radial movements between the inner strength member and the first and second annular strength members;

the inner strength member has two bulges projecting outwards respectively into the first and second hydraulic chambers in register with the inserts disposed in said chambers;

the inner strength member presents at least one axial end secured to a rigid abutment member which extends substantially radially relative to the central axis overlying at least part of the second annular strength member, elastomer studs being interposed axially between said abutment member and a first end of the second annular strength member; and the second axial end of the second annular strength member has elastomer studs extending axially away from said abutment member.

The invention also provides a motor vehicle comprising a body supported at least by a front axle and a rear axle, the rear axle being connected to the body via at least two antivibration sleeves as defined above, each sleeve being disposed with its central axis oriented vertically and with its first and second radial directions oriented in such a manner as to correct deformations of the rear axle tending to make said rear axle oversteer, each antivibration sleeve supporting a static vertical compression load oriented in such a manner as to urge the inner strength member in said first direction relative to the first annular strength member.

BRIEF DESCRIPTION OF THE DRAWINGS

Other characteristics and advantages of the invention appear from the following description of an embodiment thereof given by way of non-limiting example and with reference to the accompanying drawings.

In the drawings.

MORE DETAILED DESCRIPTION

In the various figures, the same references are used to designate elements that are identical or similar.

Figure 1:
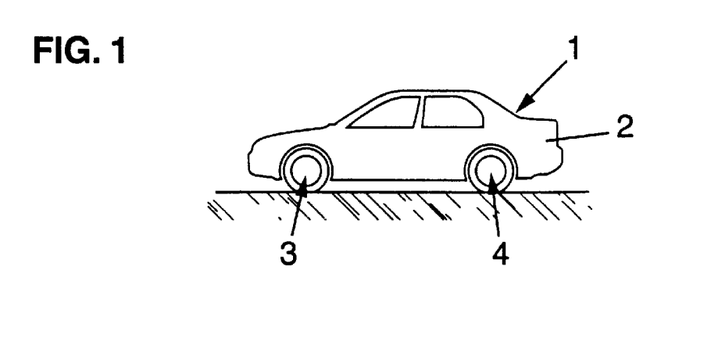
FIG. 1 is a diagrammatic view of a motor vehicle suitable for being fitted with antivibration sleeves of the invention.

FIG. 1 shows a motor vehicle 1 whose body 2 is supported by a front axle 3 and a rear axle 4.

Figure 2:
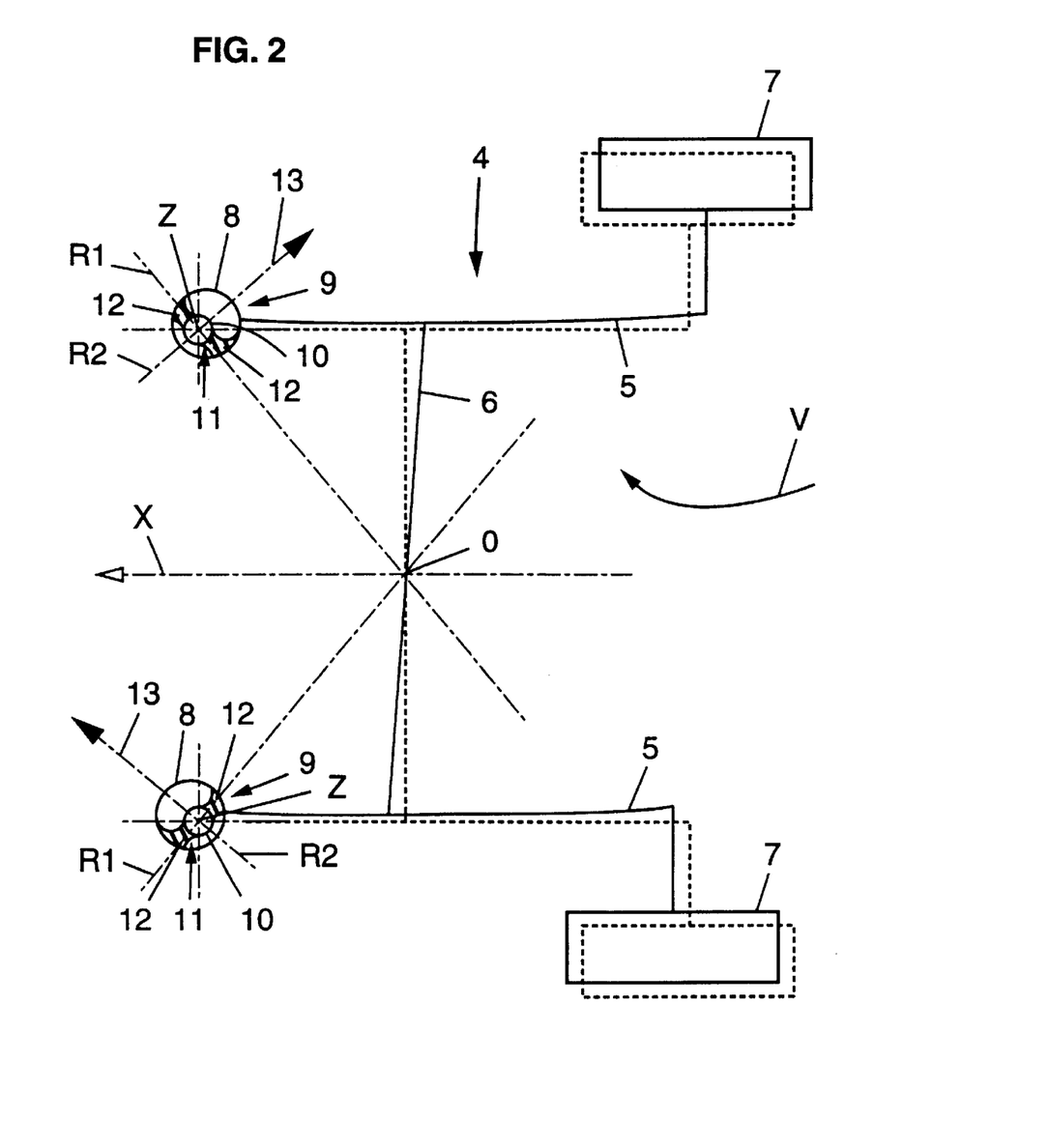
FIG. 2 is a diagrammatic view of the rear axle of the FIG. 1 vehicle fitted with antivibration sleeves of the invention.

As shown in FIG. 2, the rear axle 4 can be constituted by a flexible axle comprising two longitudinal metal arms 5 each extending in the longitudinal direction X of the vehicle and interconnected by a metal cross-member 6, e.g. presenting a certain amount of flexibility in bending and/or twisting (where appropriate, the rear axle 4 could be of a different type, for example of the multi-arm longitudinal draw-bar type).

At its rear end, each of the longitudinal arms 5 carry one of the rear wheels 7 of the vehicle while the front end of said longitudinal arm 5 is connected to the rigid outer strength member 8 of an antivibration sleeve 9.

The outer annular strength member 8 of each sleeve is substantially in the form of a vertical-axis cylindrical part which surrounds a rigid inner tubular strength member 10 that is generally made of metal. This inner strength member 10 which is fixed to the vehicle body extends longitudinally along a vertical central axis Z and is connected to the outer annular strength member 8 via an elastomer body 11 which presents two diametrically-opposite elastomer arms 12 extending in a first radial direction R1.

In this way, each antivibration sleeve 9 presents relatively high elastic stiffness in the radial direction R1 and much lower elastic stiffness in the radial direction R2 perpendicular to R1, while the elastic stiffness of each antivibration sleeve 9 along the vertical central axis Z is generally fixed to have a low value so as to improve the comfort of the vehicle.

The respective orientations of the radial directions R1 and R2 of the two antivibration sleeves 9 of the rear axle are selected in such a manner as to induce a steering effect on the rear axle to compensate the natural tendency of said rear axle to oversteer. In particular, in the example shown, the radial directions R1 of greater stiffness of the antivibration sleeve 9 are selected so as to converge rearwards towards a central point O situated between the two longitudinal arms 5 and advantageously in the vicinity of the cross-member 6.

Thus, when the vehicle turns in the direction of arrow V, the rear axle 4 which was initially in the position shown in dashed lines in FIG. 2 takes up the position shown in continuous lines in said FIG. 2: in other words, the two longitudinal arms 5 and the cross-member 6 flex under the effect of the inertia of the vehicle which, without the antivibration sleeves 9, would tend to cause the rear wheels 7 to be oriented in such a manner as to reduce the radius of the curvature of the turn, thereby causing the vehicle to oversteer.

This tendency is avoided by the antivibration sleeves 9 since the outer strength members 8 of both sleeves move in the direction indicated by arrow 13, i.e. along the directions R2 of lower stiffness of the two antivibration sleeves. This movement compensates the deformation of the rear axle 4 and keeps the rear wheels 7 substantially parallel to the longitudinal axis X of the vehicle: this ensures that the vehicle does not exhibit oversteer behavior while turning.

Figure 3:
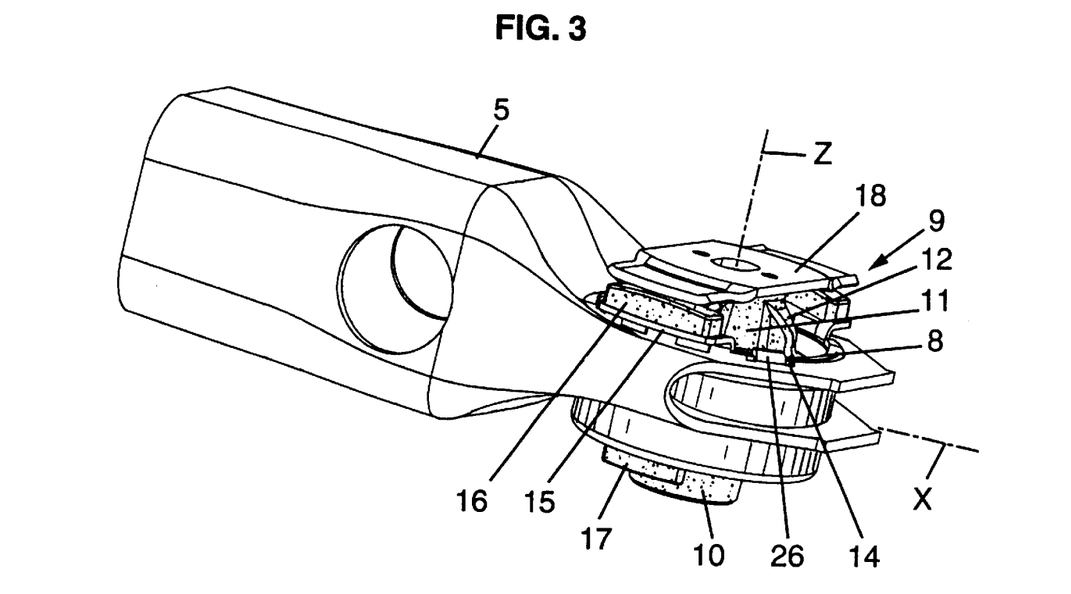
FIG. 3 is a perspective view showing one of the longitudinal arms of the FIG. 2 rear axle fitted with an antivibration sleeve constituting an embodiment of the invention.
Figure 4:
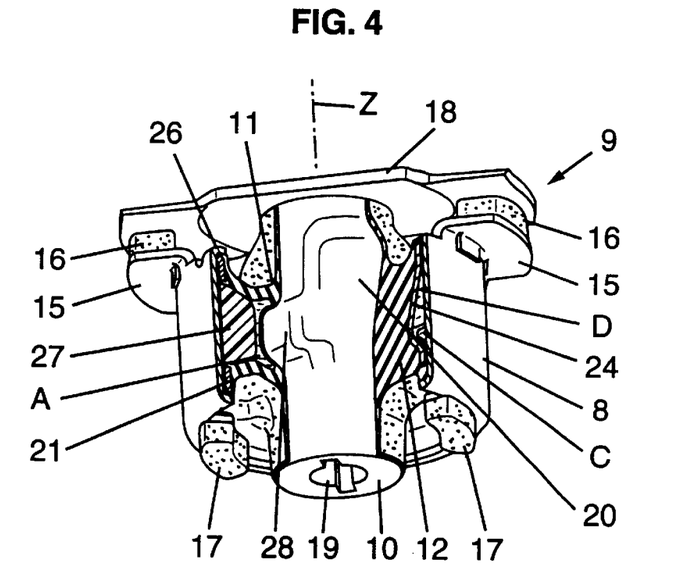
FIG. 4 is a cutaway view of the antivibration sleeve fitted to the longitudinal arm of FIG. 3.

As shown in FIGS. 3 and 4, the outer annular strength member 8 of each antivibration sleeve 9 can advantageously be a piece of sheet metal that has been stamped and cut to shape, and which is received in a vertical housing 14 of the corresponding longitudinal arm 5, the top edge of the strength member 8 having two horizontal tabs 15, for example, which extend radially outwards and which come to bear against the arm 5 around the housing 14.

An elastomer stud 16 can optionally be molded on each horizontal tab 15, and two elastomer studs 17 can also, where appropriate, be molded on the bottom end of the strength member 8 to project downwards. The top studs 16 are to co-operate with an abutment member 18 such as a bearing plate by coming into abutment therewith, said member being secured to the top end of the inner strength member 10 and being designed for fixing to the vehicle body together with said inner strength member 10. The elastomer studs 16 thus limit vertical relative displacements between the outer strength member 8 and the inner strength member 10 in the direction where the abutment member 8 and the horizontal tabs 15 of the outer strength member come closer together.

In addition, the bottom elastomer tabs 17 co-operate with a portion that is secured to the body 2 of the vehicle by coming into abutment therewith so as to limit downward movement of the rear end of the longitudinal arm 5.

Also, as shown in FIGS. 5 to 9, the inner strength member 10 of the antivibration sleeve (which member is advantageously made as a light alloy casting) is in the form of a tubular part pierced by a central hole 19 which allows a bolt or other fixing member to pass therethrough in order to fix the inner strength member 10 to the vehicle body.

Figure 6:
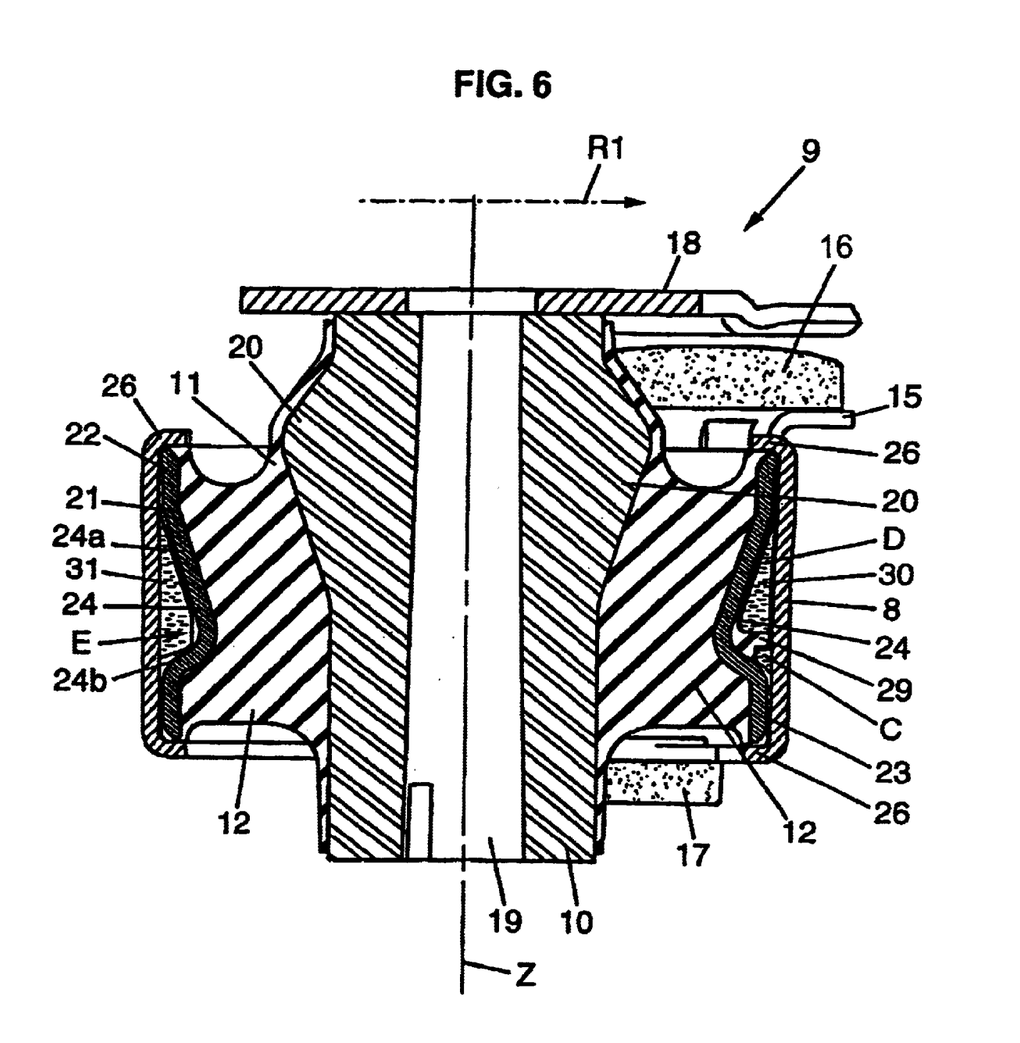
FIGS. 6 and 7 are respective section views on lines VI—VI and VII—VII of FIG. 5.

The outer surface of the strength member 10 has two wedge-shaped bearing zones 20 in register with the two arms 12 of the elastomer body, the bearing zones projecting radially outwards and converging downwards towards the central axis Z (see FIGS. 4 and 6).

Figure 9:
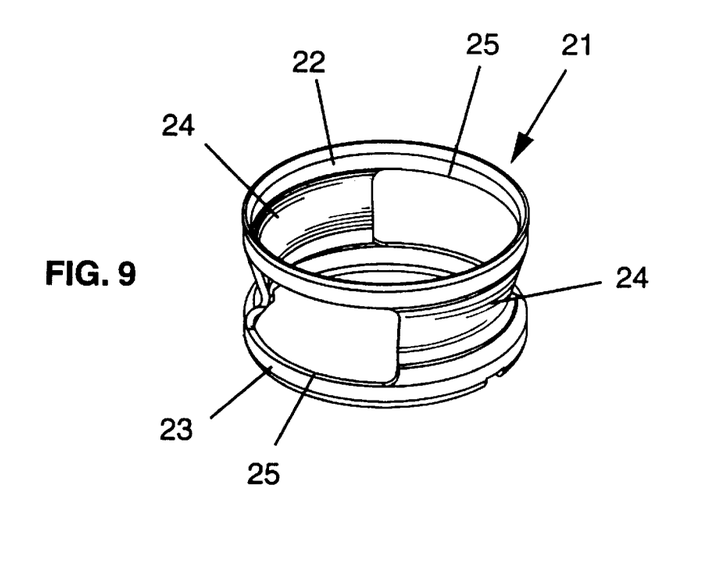
FIG. 9 is a perspective view of an intermediate strength member embedded in the elastomer body of FIG. 8.

The elastomer body 11 is overmolded and bonded onto the outside surface of the inner strength member 10 and it extends radially outwards as far as an intermediate annular strength member 21 which is in the form of a ring of stamped and cutout sheet metal that can clearly be seen in FIG. 9.

This intermediate strength member 21 has two continuous annular load-carrying surfaces 22 and 23 which are interconnected by two outwardly-punched bearing zones 24 co-operating the annular load-carrying surfaces 22 and 23 to define two open windows 25.

Figure 5:
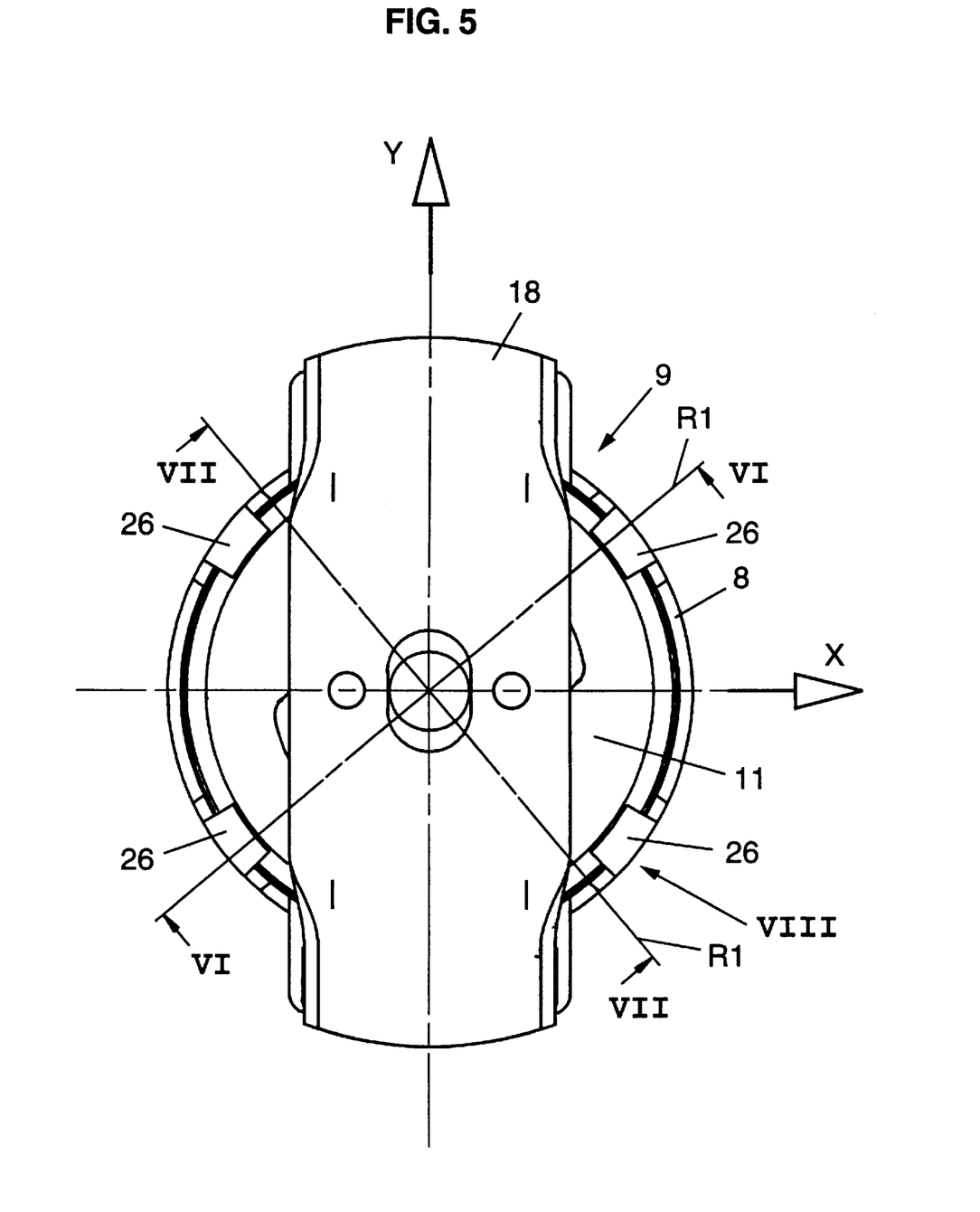
FIG. 5 is a plan view of the antivibration sleeve of FIG. 4.

As can be seen in FIGS. 4 and 5, the bearing zones 24 are placed facing the bearing zones 20 of the inner strength member 10 and each presents:

- a top portion 24a which extends parallel to the corresponding bearing zone 20, converging downwards and inwards; and
- a bottom portion 24b which is at a greater angle relative to the vertical than is the top portion 24a and extends downwards while diverging strongly outwards.

By means of these dispositions, the static forces due to the weight of the vehicle 1 and to the rear suspension, which give rise to the outer strength member 8 being urged upwards, generate compression prestress in the arms 12 of the elastomer body instead of generating shear and/or traction stresses. This improves the longevity of the antivibration sleeve, particularly since such prestress makes it possible to eliminate or at least limit traction stresses while the antivibration sleeve is in dynamic operation.

Figure 7:
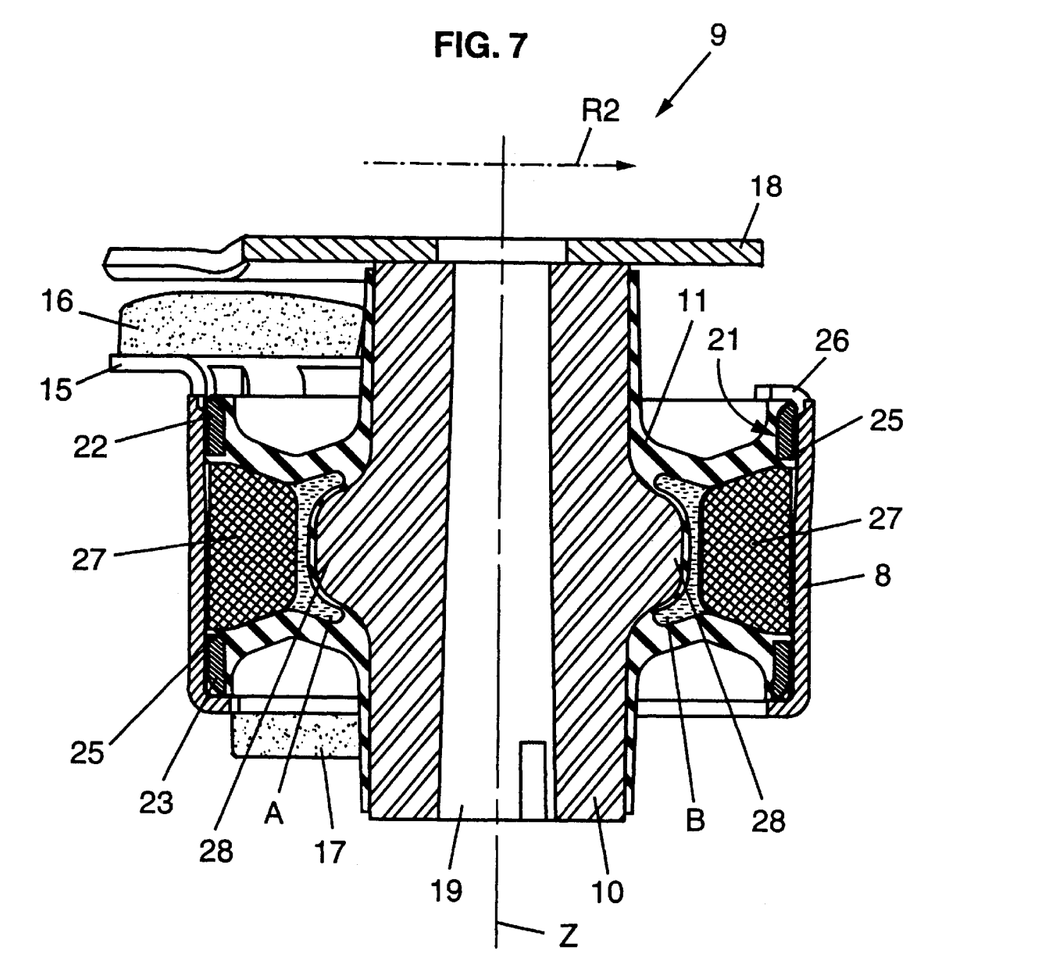
Figure 8:
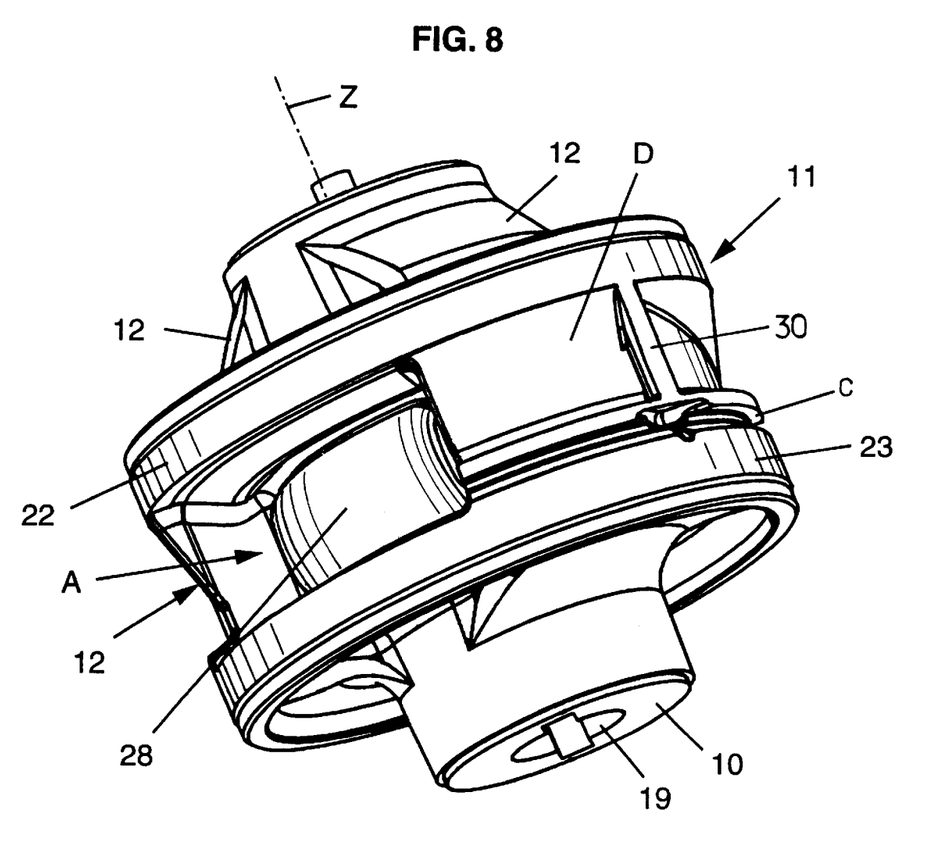
FIG. 8 is a perspective view of the elastomer body of the antivibration sleeve of FIG. 4, seen looking along arrow VIII of FIG. 5.

Furthermore, as can be seen in FIGS. 4, 7, and 8, the elastomer body 5 has two cavities formed in correspondence with the windows 25 of the intermediate strength member between the arms 12. These cavities co-operate with the outer strength member 8 to define two hydraulic chambers A and B which are filled with liquid, which are closed in leakproof manner by radial clamping of the outer strength member 8 against the annular load-carrying surfaces 22, 23 of the intermediate strength member 21, the outer strength member 8 also being secured axially to the intermediate strength member 21 via tabs 26 of said outer strength member which are crimped against the axial ends of the intermediate strength member 21.

The two hydraulic chambers A and B are mutually aligned in the direction R2 of low elastic stiffness of the antivibration sleeve. To limit radial movements between the inner strength member 10 and the outer strength member 8 in the direction R2, each of the hydraulic chambers A and B advantageously receives an insert 27, e.g. made of a substantially rigid plastic material, and adapted to co-operate in abutment against a bulge 28 that projects radially outwards from the inner strength member 10 into the corresponding hydraulic chamber A and B.

The two hydraulic chambers A and B communicate with each other via a narrow passage C which can advantageously be defined between the outer strength member 8 and a circumferential groove formed in an elastomer bead 29 which extends circumferentially in the bottom and outer portion of one of the bearing zones 24 of the intermediate strength member 21, known as the first bearing zone 24.

Thus, the relative radial vibratory motion between the inner strength member 10 and the outer strength member 8 causes liquid to be interchanged between the hydraulic chambers A and B via the narrow passage C, and these interchanges of liquid enable said radial vibratory motion to be damped, in conventional manner.

Said first bearing zone 24 of the intermediate strength member 21 also co-operates with the outer strength member 8, above the elastomer bead 29, to define a first liquid duct D which communicates firstly with the hydraulic chamber A and secondly with the hydraulic chamber B. This first liquid duct D is closed by an axial rib 30 made of elastomer of relatively small thickness which extends parallel to the axis Z and radially outwards as far as an outer edge bearing in leaktight manner against the inside surface of the strength member 8.

This rib 30 is sufficiently flexible to act as a decoupling valve, which given the relatively large flow section of the first liquid duct D (in practice three times the flow section of the narrow passage C), enables vibration of relatively small amplitude (e.g. less than 1 mm) and of relatively high frequency (e.g. lying in the range 5 Hz to 50 Hz) to be transmitted directly from one hydraulic chamber to the other, thereby enabling such low amplitude and high frequency vibrations to be filtered without transmitting them from one strength member to the other.

Similarly, the second bearing zone 24 of the intermediate strength member 21 co-operates with the outer strength member 8 to define a second liquid duct E which is closed by a radial rib 31 extending parallel to the axis Z and radially outwards to an outer edge in leaktight contact with the outer strength member 8. This second axial rib 31 likewise forms a decoupling valve, in the same manner as the above-mentioned rib 30.

What is claimed is:

1. An antivibration sleeve comprising:
   a rigid inner strength member which extends longitudinally along a central axis; and
   at least a first rigid annular strength member which surrounds the inner strength member and the central axis, and at least one elastomer body connecting the inner strength member to the first annular strength member, said elastomer body including two diametrically opposite arms each extending along a first radial direction from the inner strength member to said first annular strength member, the elastomer body being shaped so that the antivibration sleeve presents relatively high elastic stiffness in said first radial direction and lower elastic stiffness in a second radial direction substantially perpendicular to said first radial direction;
   wherein the inner strength member presents, at least in register with the two arms of the elastomer body, two wedge-shaped bearing zones which extend so as to converge towards the central axis in a first direction parallel to said central axis;
   wherein the first annular strength member also presents, at least in register with the two bearing zones of the inner strength member, first and second complementary bearing zones in the form of wedges which converge towards the central axis in said first direction;
   wherein each arm of the elastomer body is bonded to at least one of the bearing zones of the inner strength member and to one of the complementary bearing zones of the first annular strength member; and
   wherein the elastomer body is overmolded on the first annular strength member and said first annular strength member is surrounded by a second strength member which is secured to the first annular strength member and to the elastomer body, co-operating with said elastomer body to define first and second hydraulic chambers filled with liquid and separated from each other by the two arms of the elastomer body, the first and second hydraulic chambers communicating with each other via at least one narrow passage which is provided between the first bearing zone of the first annular strength member, and the second strength member.

2. An antivibration sleeve according to claim 1, in which the first bearing zone of the first annular strength member co-operates with the second annular strength member to define a first liquid duct which extends in a circumferential direction about the central axis and which communicates firstly with the first hydraulic chamber and secondly with the second hydraulic chamber, said first liquid duct presenting a flow section that is at least three times greater than the flow section of said narrow passage, the elastomer body having a first axial rib which extends radially and parallel to the central axis from the first bearing zone of the first annular strength member to an outside edge in contact with the second annular strength member, said first axial rib thus closing the first liquid duct and presenting sufficient flexibility to enable a certain amount of decoupling between the inner strength members with respect to at least some radial vibrations at a frequency lying in the range 5 Hz to 50 Hz.

3. An antivibration sleeve according to claim 2, in which the elastomer body further includes a bead which extends in the circumferential direction between the first bearing zone of the first annular strength member and the second annular strength member, said bead co-operating with the second annular strength member to define said narrow passage and also defining part of the first liquid duct.

4. An antivibration sleeve according to claim 1, in which the second bearing zone of the first annular strength member co-operates with the second annular strength member to define a second circumferential liquid duct which communicates firstly with the first hydraulic chamber and secondly with the second hydraulic chamber, and the elastomer body includes a second axial rib which extends radially and parallel to the central axis from the second bearing zone of the first annular strength member to an outside edge in contact with the second annular strength member, the second axial rib closing the second liquid duct and presenting sufficient flexibility to enable a certain amount of decoupling between the inner strength member and the first and second annular strength members with respect to at least some radial vibrations at a frequency lying in the range 5 Hz to 50 Hz.

5. An antivibration sleeve according to claim 1, in which the first annular strength member is constituted by a metal ring which presents two openings disposed respectively in register with the first and second hydraulic chambers, these two openings being separated from each other by said first and second bearing zones which are constituted by stamped portions of the metal ring.

6. An antivibration sleeve according to claim 1, in which the first and second hydraulic chambers are occupied in parts by inserts adapted to limit radial movements between the inner strength member and the first and second annular strength members.

7. An antivibration sleeve according to claim 6, in which the inner strength member has two bulges projecting outwards respectively into the first and second hydraulic chambers in register with the inserts disposed in said chambers.

8. An antivibration sleeve comprising:
   a rigid inner strength member which extends longitudinally along a central axis; and
   at least a first rigid annular strength member which surrounds the inner strength member and the central axis, and at least one elastomer body connecting the inner strength member to the first annular strength member, said elastomer body including two diametrically opposite arms each extending along a first radial direction from the inner strength member to said first annular strength member, the elastomer body being shaped so that the antivibration sleeve presents relatively high elastic stiffness in said first radial direction and lower elastic stiffness in a second radial direction substantially perpendicular to said first radial direction;
   wherein the inner strength member presents, at least in register with the two arms of the elastomer body, two wedge-shaped bearing zones which extend so as to converge towards the central axis in a first direction parallel to said central axis;
   wherein the first annular strength member also presents, at least in register with the two bearing zones of the inner strength member, first and second complementary bearing zones in the form of wedges which converge towards the central axis in said first direction;
   wherein each arm of the elastomer body is bonded to at least one of the bearing zones of the inner strength member and to one of the complementary bearing zones of the first annular strength member; and
   wherein the inner strength member presents at least one axial end secured to a rigid abutment member which extends substantially radially relative to the central axis overlying at least part of the second annular strength member, elastomer studs being interposed axially between said abutment member and a first end of the second annular strength member.

9. An antivibration sleeve according to claim 8, in which the second axial end of the second annular strength member has elastomer studs extending axially away from said abutment member.

10. A motor vehicle comprising a body supported at least by a front axle and a rear axle, the rear axle being connected to the body via at least two antivibration sleeves, each antivibration sleeve comprising:

a rigid inner strength member which extends longitudinally along a central axis; and at least a first rigid annular strength member which surrounds the inner strength member and the central axis, and at least one elastomer body connecting the inner strength member to the first annular strength member, said elastomer body including two diametrically opposite arms each extending along a first radial direction from the inner strength member to said first annular strength member, the elastomer body being shaped so that the antivibration sleeve presents relatively high elastic stiffness in said first radial direction and lower elastic stiffness in a second radial direction substantially perpendicular to said first radial direction;

wherein the inner strength member presents, at least in register with the two arms of the elastomer body, two wedge-shaped bearing zones which extend so as to converge towards the central axis in a first direction parallel to said central axis;

wherein the first annular strength member also presents, at least in register with the two bearing zones of the inner strength member, first and second complementary bearing zones in the form of wedges which converge towards the central axis in said first direction;

wherein each arm of the elastomer body is bonded to at least one of the bearing zones of the inner strength member and to one of the complementary bearing zones of the first annular strength member; and wherein each sleeve is disposed with its central axis oriented vertically and with its first and second radial directions oriented in such a manner as to correct deformations of the rear axle tending to make said rear axle oversteer, each antivibration sleeve supporting at least a static vertical compression load oriented in such a manner as to urge the inner strength member in said first direction relative to the first annular strength member.

* * * * *